United States Patent
Ilmonen

(10) Patent No.: US 9,454,263 B2
(45) Date of Patent: Sep. 27, 2016

(54) CORRECTION OF TOUCH SCREEN CAMERA GEOMETRY

(75) Inventor: Tommi Ilmonen, Espoo (FI)

(73) Assignee: MULTYTOUCH OY, Helsinki (FI)

(*) Notice: Subject to any disclaimer, the term of this patent is extended or adjusted under 35 U.S.C. 154(b) by 113 days.

(21) Appl. No.: 14/233,127

(22) PCT Filed: Jul. 18, 2011

(86) PCT No.: PCT/FI2011/050660
§ 371 (c)(1),
(2), (4) Date: Mar. 17, 2014

(87) PCT Pub. No.: WO2013/011188
PCT Pub. Date: Jan. 24, 2013

(65) Prior Publication Data
US 2014/0210794 A1    Jul. 31, 2014

(51) Int. Cl.
*G06F 3/041* (2006.01)
*G06F 3/042* (2006.01)
*G06F 3/03* (2006.01)

(52) U.S. Cl.
CPC ........... *G06F 3/0425* (2013.01); *G06F 3/0304* (2013.01); *G06F 3/0325* (2013.01); *G06F 3/0418* (2013.01)

(58) Field of Classification Search
CPC .. G06F 3/0418; G06F 3/0425; G06F 3/0304; G06F 3/0325
USPC ........................................................ 345/173
See application file for complete search history.

(56) References Cited

U.S. PATENT DOCUMENTS

| 5,485,682 | A | 1/1996 | Lebreton |
| 5,832,139 | A | 11/1998 | Batterman et al. |
| 2005/0168448 | A1 | 8/2005 | Simpson |
| 2005/0226505 | A1 | 10/2005 | Wilson |
| 2006/0007170 | A1* | 1/2006 | Wilson et al. ................. 345/173 |
| 2006/0036944 | A1 | 2/2006 | Wilson |
| 2008/0013826 | A1 | 1/2008 | Hillis et al. |
| 2008/0144944 | A1 | 6/2008 | Breed |

(Continued)

FOREIGN PATENT DOCUMENTS

| EP | 0700197 | 3/1996 |
| JP | 2009 093412 | 4/2009 |

OTHER PUBLICATIONS

Dan Mac Isaac et al. "Basic Physics of the Incandescent lamp (Lightbulb)", The Physics Teacher, Dec. 1, 1999, pp. 520-525, XP055085011, Retrieved from the Internet, URL:http://physicsed.buffalostate.edu/pubs/TPT/TPTDec99Filament.pdf.

(Continued)

*Primary Examiner* — Jonathan Boyd
(74) *Attorney, Agent, or Firm* — Shalom Wertsberger; Saltamar Innovations

(57) ABSTRACT

A touch display has a touch screen to display images and one or more infrared cameras to take images of objects contacting the touch screen. One or more calibration patterns are formed on the touch screen. In response, an automatic process takes place, with: producing an image of the touch screen by taking with each one of the group of infrared cameras a set of one or more images of the calibration patterns; determining geometric distortions of the images with relation to the formed one or more calibration patterns; and calculating calibration parameters configured to enable computational compensation of the determined geometric distortions. The calibration parameters are then stored.

20 Claims, 5 Drawing Sheets

(56) References Cited

U.S. PATENT DOCUMENTS

| | | |
|---|---|---|
| 2008/0192017 A1 | 8/2008 | Hildebrandt |
| 2009/0116742 A1 | 5/2009 | Nishihara |
| 2010/0073326 A1 | 3/2010 | Keam |
| 2010/0079385 A1 | 4/2010 | Holmgren |
| 2010/0201823 A1* | 8/2010 | Zhang .................. H04N 5/2256 348/164 |
| 2011/0019108 A1 | 1/2011 | Nelson |
| 2011/0050595 A1 | 3/2011 | Lundback |
| 2011/0050640 A1 | 3/2011 | Lundback et al. |

OTHER PUBLICATIONS

European Patent Office Search Report is 11869586.5-1507, a related patent application, mailed Apr. 29, 2015.

European Patent Office Search Report is 11869586.5-1507/2734912, PCT/FI2011050660, a related patent application, mailed Jun. 22, 2015.

Jacob Gube: "50 Excellent Digital Photography Photoshop Tutorials—Smashing Magazine", , Dec. 7, 2008, XP055220221, Retrieved from the Internet: URL:http://www.smashingmagazine.com/2008/12/50-excellentdigital- photography-photoshop-tutorials/ [retrieved on Oct. 12, 2015].

Anonymous: "Olympus Microscopy Resource Center I Contrast Stretching and Histogram Normalization—Java Tutorial", , Apr. 1, 2002, XP055219883, Retrieved from the Internet: URL:http://www.olympusmicro.com/primer/java/digitalimaging/processing/histogramstretching/ [retrieved on Oct. 9, 2015].

* cited by examiner

CORRECTION OF TOUCH SCREEN CAMERA GEOMETRY

TECHNICAL FIELD

The present invention generally relates to correction of touch screen camera geometry. The invention relates particularly, though not exclusively, to automatic geometry calibration of an infrared-based multitouch display.

BACKGROUND

In a camera-based multitouch display, the cameras are not always placed exactly as designed. This is caused e.g. by finite mechanical tolerances that cause some variation in the physical setup of multitouch display systems. Hence, for optimal performance, it is necessary to calibrate each display separately, for each of its cameras. The parameters to calibrate involve:
camera sensor region of interest (ROI), i.e. the area of the camera sensor that is used for touch tracking;
camera lens distortion parameters (such as barrel distortion);
focus point for performing anti-distortion calculations; and
offset of the image from desired target location.

FIG. 1a shows various errors in images of 16 cameras. In FIG. 1a, each camera is designed to be centrally located so that the cameras form a regular grid. While the camera images of the bottom row should be rather similar, differences in lens placement and lens properties make the images vary as is illustrated by FIG. 1a. FIG. 1b presents a more optimized view of the same camera setup, after per camera region of interest (ROI) adjustment, to achieve more even coverage of the display screen.

The camera ROI placement can be adjusted per-camera in order to account for the physical differences between different cameras. Also camera distortion parameters can be optimized per camera, as illustrated by in FIGS. 2 and 3. FIG. 2 shows an object seen by a camera before distortion parameter optimization and FIG. 3 shows the object after the distortion parameter optimization.

Recognition of pointing objects from an infra-red based multitouch display depends on the quality of the operation of the cameras. Camera errors increase difficulty of accurately recognizing boundaries objects that point the touch screen and of determining when an object actually touches the display.

SUMMARY

According to a first example aspect of the invention there is provided a method comprising:
forming one or more calibration patterns on a touch screen comprising a group of one or more infrared cameras configured to take images of objects contacting the touch screen; and automatically:
producing an image of the touch screen by taking with each one of the group of infrared cameras a set of one or more images of the calibration patterns;
determining geometric distortions of the images with relation to the formed one or more calibration patterns; and
calculating calibration parameters configured to enable computational compensation of the determined geometric distortions;
the method further comprising:
storing the calibration parameters.

The method may further comprise detecting a start command and responsively starting the producing of the image, the determining of the geometric distortions and the calculating of the calibration parameters.

The group of infrared cameras may be configured to take images of the calibration patterns through the touch screen.

The forming of the one or more calibration patterns onto the touch screen may comprise producing the one or more calibration patterns with a calibration device operable to produce the one or more calibration patterns when placed on the touch screen.

The forming of the one or more calibration patterns onto the touch screen may comprise producing corresponding visible light patters by the touch screen. The visible light patters may be configured to form an infrared light component of a corresponding shape and/or the infrared cameras may be configured to operate also on visible light wavelengths.

Surprisingly, typical commercially available infrared cameras and flat display panels have sufficiently overlapping ranges of operating wavelengths so that the display can be used to produce calibration patterns for the one or more infrared image capture units. In addition to flat panel displays, video projectors can also be used for image generation, with similar overlapping visible/infrared wavelengths. It is appreciated that in case of projector based displays, the calibration geometric distortions may also account for possible geometric errors in the projector image.

The forming of the one or more calibration patterns onto the touch screen by producing corresponding visible light patters by the touch screen may enable inherently matching the calibration patters with the touch screen and thereby avoiding possible alignment errors that may occur when using a separate calibration device.

The forming of the one or more calibration patterns onto the touch screen by producing corresponding visible light patters by the touch screen may be emphasized by using a reflective cover that is arbitrarily placed on the touch screen to reflect light emitted by the touch screen to the group of infrared cameras.

The cover may have a fluorescent surface configured to absorb visible light and responsively reflect infrared light.

When forming the one or more calibration patterns onto the touch screen by producing corresponding visible light patters by the touch screen, the resulting image of the touch screen may be too noisy for determining of the geometric distortions. Hence, the method may further comprise taking with each of the group of infrared cameras a set of plural images to improve signal to noise ratio.

The method may further comprise optimizing the region of interest of each camera. The optimizing of the region of interest may involve the steps of:
1) Showing on the screen a pattern that has a small rectangle or circle at the center of the ROI;
2) Using a blob-detection algorithm, estimate the location of the blob in the uncorrected camera image;
3) Adjusting the active camera sensor capture area based on the difference of the blob location on the uncorrected image, compared to the ideal blob location on the uncorrected image; and
4) If the adjustment is small enough, then finish, otherwise return to step 1.

The taking of the plural images may involve displaying visible images on the screen and:
forming a first image sequence PB by taking plural images while the visible image on the screen is completely black;

forming a second image sequence PW by taking plural images while the visible image on the screen is completely white;

forming a third image sequence PP by taking plural images while a given calibration pattern is produced by the touch screen; and forming for each image sequence an enhanced collective image for the determining of geometric distortions of the images thereby producing respectively first, second and third enhanced image sequences PBe, PWe and PPe.

The method may further comprise normalizing the images of the calibration pattern according to the formula of $NPe=(PPe-PBe)/(PWe-PBe)$, wherein NPe represents the normalized image pixel value.

The method may further comprise reducing noise from the normalized images of the calibration pattern by noise reduction filtering.

The method may further comprise detecting edges of the calibration patterns. The curvature may be calculated for the detected edges of the calibration patterns. The calculating of the curvature may be performed line segment by line segment.

The method may further comprise calculating of curvatures of the detected edges. Average of the curvatures, AC, may be calculated.

The method may further comprise calculating mutual angles of the edges. The method may further comprise calculating an average angle of the edges. An average angle deviation AA may be calculated from the calculated angles of the edges or from the average angle of the edges.

A combined error measure may be calculated by summing the AC and AA.

The method may further comprise calculating for each edge the deviation from the nearest multiple of 90 degree angle.

The method may further comprise calculating the average deviation AD from the nearest 90 degree angle.

A combined error measure may calculated by summing the AC, AA and AD.

The method may further comprise calculating error functions such that when the geometric errors in the image of the touch screen is compensated using the error functions, the combined error measure is smaller than with at least one other set of error functions.

The error functions may measure one or more of the following items:

location of the camera region of interest (ROI), compared to desired ROI curvature of straight lines;

orientation;

size; and offset.

According to a second example aspect of the invention there is provided an apparatus comprising:

a touch screen configured to display images and comprising a group of one or more infrared cameras configured to take images of objects contacting the touch screen;

means for forming on the touch screen one or more calibration patterns that are visible to the one or more the infrared cameras;

a processor configured to automatically:

cause producing an image of the touch screen by taking with each one of the group of infrared cameras a set of one or more images of the calibration patterns;

determine geometric distortions of the images with relation to the formed one or more calibration patterns; and calculate calibration parameters configured to enable computational compensation of the determined geometric distortions;

the processor being further configured to store the calibration parameters.

The means for forming of the one or more calibration patterns may comprise a calibration screen. The calibration screen may comprise a passive element configured to cast patterns produced by the touch screen to the group of infrared cameras. The passive element may comprise a sheet or plate configured, when placed on the touch screen, to reflect patterns produced by the touch screen to the group of infrared cameras.

Advantageously, a passive element may produce calibration patterns independent of the alignment of the passive element on the surface of the touch screen and thereby remove the need to accurately align the calibration screen with relation to the touch screen.

The calibration screen may comprise an active element configured produce a calibration pattern for the group of infrared cameras. The active element may comprise one or more infrared illumination units. The infrared illumination units may comprise infrared light emitting diodes. Alternatively or additionally, the infrared illumination units may comprise windows in a sheet or plate, which windows are at least partly transparent for infrared light so as to pass ambient infrared light through the windows to the group of infrared cameras.

The calibration screen may comprise one or more fluorescent patterns configured to absorb visible light and responsively reflect infrared light so as to produce infrared calibration patterns when illuminated by the touch screen.

The apparatus may further comprise means for implementing a method according to any embodiment of the first aspect.

According to a third example aspect of the invention there is provided a computer program comprising computer executable program code which when executed by a processor causes an apparatus to perform the method of the first aspect.

The processor may be formed of one or more discrete circuitries.

According to a fourth example aspect of the invention there is provided a computer readable memory medium comprising the computer program code of the third aspect. The memory medium may be non-transient. The memory medium may be formed of one or more discrete circuitries.

According to a fifth aspect of the invention there is provided an apparatus comprising:

one or more infrared image capture units configured to capture images of human interaction on a display surface; and a processor configured to calibrate the one or more infrared image capture units to adjust camera region of interest, and compensate geometric distortions when a calibration screen is placed in front of the display, based on signals received from the one or more infrared image capture units.

The calibration screen may be reflective in wavelengths on which the one or more infrared image capture units operate.

The apparatus may further comprise a display configured to display images on the display surface under control of the processor.

The display and the one or more infrared image capture units may have overlapping ranges of operating wavelengths for enabling the display to produce calibration patterns for the one or more infrared image capture units.

The processor may further be configured to show different visible patterns on the display for producing different calibration patterns and detecting how the one or more infrared image capture units respond to different patterns.

The processor may further be configured to perform a calibration process according to any method of the first aspect.

The calibration screen may have a fixed pattern suited for providing a reference for the calibrating. The fixed pattern may be printed.

The calibration screen may contain a pattern that appears in infrared light.

The cover may be configured to produce a pattern with light emitting diodes. The light emitting diodes may be infrared light emitting diodes.

The calibration screen may have windows configured to produce a pattern when the calibration screen is illuminated from behind with infrared light.

The calibration screen may be placed directly in contact with the display, or placed further away.

The calibration screen may be a cover sheet.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding exemplary aspects and embodiments of the present invention have been illustrated in the foregoing. The above embodiments are used merely to explain selected aspects or steps that may be utilized in implementations of the present invention. Some embodiments may be presented only with reference to certain aspects of the invention. It should be appreciated that corresponding embodiments may apply to other aspects as well.

BRIEF DESCRIPTION OF THE DRAWINGS

Some example embodiments of the invention will be described with reference to the accompanying drawings, in which.

DETAILED DESCRIPTION

In the following description, like numbers denote like elements.

In the following examples of various embodiments of the invention an LCD screen is used as an example of an image layer. The LCD screen may comprise a film that forms a visible image and optionally also other elements such as background illumination, infrared (IR) illumination, incoming IR intensity detection across the screen, and/or one or more speakers for outputting sound. It is appreciated that the invention may likewise be applied with any other types of image layers as well, or screens for simpler expression. Generally, an image layer is any means for producing a visible image for a user, such as an electric display, a screen displaying a projected image or a substance carrying printed, dyed image, or woven image. However, the image layer should be sufficiently transparent or translucent for IR light that is used for detecting a pointing object through the image layer as will be explained in more detail in the following.

Figure 1A:
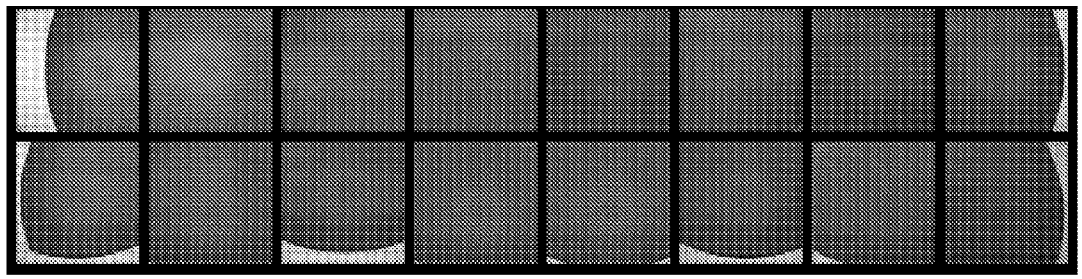
FIG. 1 shows various errors in images of 16 cameras.
Figure 1B:
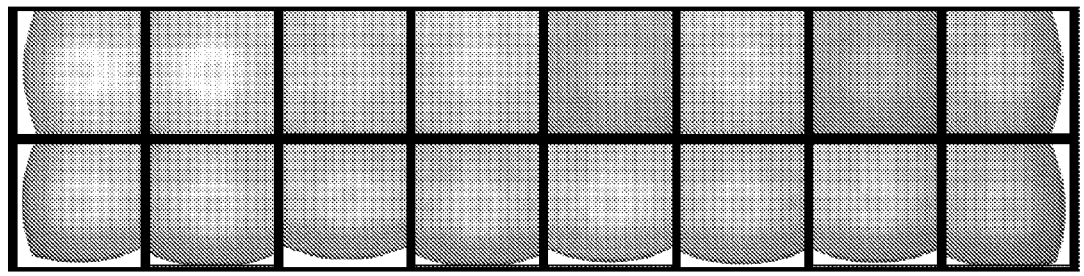
Figure 2:
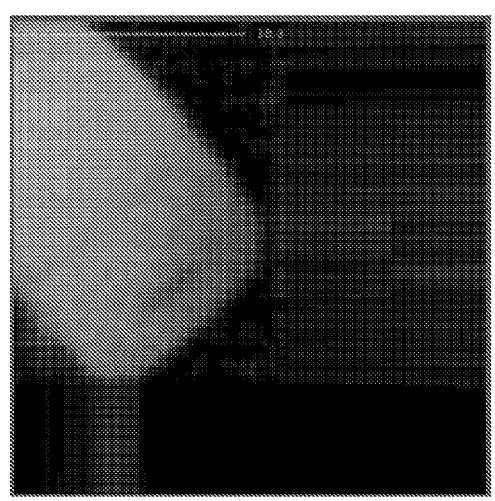
FIGS. 2 and 3 a camera image before and after distortion parameters have been optimized per camera.
Figure 3:
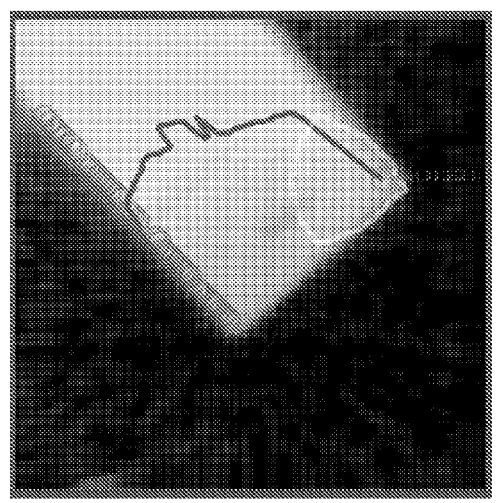
Figure 4:
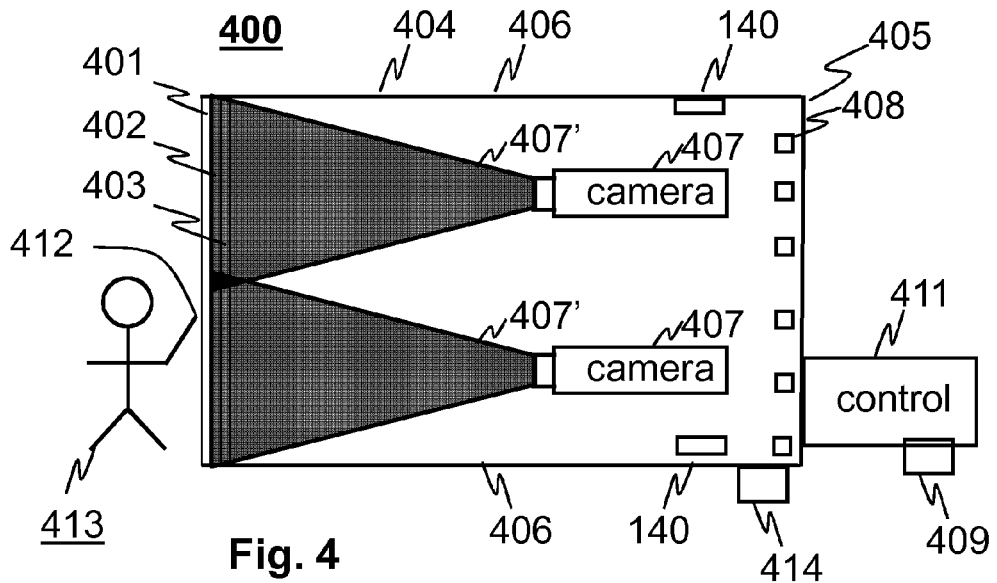
FIG. 4 shows a block diagram of a system according to an embodiment of the invention.

FIG. 4 shows a block diagram of a system 400 according to an embodiment of the invention. FIG. 4 also shows a user 413 for facilitating the description of particular order of different elements. The system 400 is suited for use as an interactive user interface device e.g. as a built in dynamic menu in a restaurant, as a display screen at a ticket office, or generally wherever an interactive display and optical pointing recognition is desired.

The system 400 comprises as an outmost element or as facing to the user 413 a touching surface 401 such as a toughened glass plate, then an LCD film 402 as a display screen and a diffusion layer 403 behind the screen.

The diffusion layer 403 is configured to spread the light coming from a background light source (described in the following), so that an image displayed on the screen appears even from many directions.

In order to support the aforementioned optical elements, there is provided a casing 404. The casing 404 comprises a back wall 405 attached to side walls 406. A background light source 408 may be located in the casing 404 for background illumination of the screen 402.

It should be appreciated that the structure presented in FIG. 4 is only illustrative of one embodiment. In some other embodiments, the structure is different. For instance, the diffusion layer 403 can be omitted.

The side walls 406 may be coated from the inner side with some reflective material in order to deliver maximum amount of light to the screen and finally to users of the system.

Inside the casing, there is an image capture unit 407 that is in this particular case has an array of IR cameras configured to see through the diffusion layer 403, screen 402 and the touching surface 401 any objects placed near or at the touching surface 401. Further in FIG. 4, there is drawn as a dotted area an IR light reception space 407' for each of the two shown IR cameras. The camera is configured to detect signals that are outside the visible light wavelengths. There may be for example a filter in front of the lens of the camera providing this effect. The camera may be based on for example CCD (charge-coupled device) or CMOS (complementary metal-oxide-semiconductor) technology. The image capture unit 407 may comprise more than one camera e.g. for better resolution (in overlapping imaging regions), for smaller distance between the screen and the cameras, and/or for covering larger LCD screens 402.

The distance between the background light source 408 and the diffusion layer 403 may generally depend on the space that the camera setup requires. The distance may be shortened for more compact sized system e.g. by moving the camera forward and/or turning the camera around (to point away from the screen) and using a mirror or prism in front of the camera to capture the activities on the screen.

The camera 407 and the IR LEDs 410 may not be seen from the outside of the system if their shadow is negligent e.g. due to the highly diffused illumination coming from the background lights and as the reflective inner side of the system provides evens further illumination of the display surface. Further, the diffusion layer 403 may prevent the users from seeing any details from inside the system.

The system 400 may comprise invisible light sources 410 such as IR light sources for facilitating input detection on IR wavelengths. Additionally or alternatively, the system 400 may comprise an audio speaker 414 for providing audible signals to the user 413.

Furthermore, the system 400 may comprise one or more buttons 409 for receiving user input. For instance, there may be a dedicated calibration initiation button 409 so located that administrative personnel only can reach the button.

In one embodiment, there are 8 columns×4 rows of cameras 407 and invisible light sources each covering a different sub-region of the touching surface 401. The different sub-regions may have a some overlap (e.g. 2, 5 or 10%) or the different sub-regions may be non-overlapped.

Figure 5:
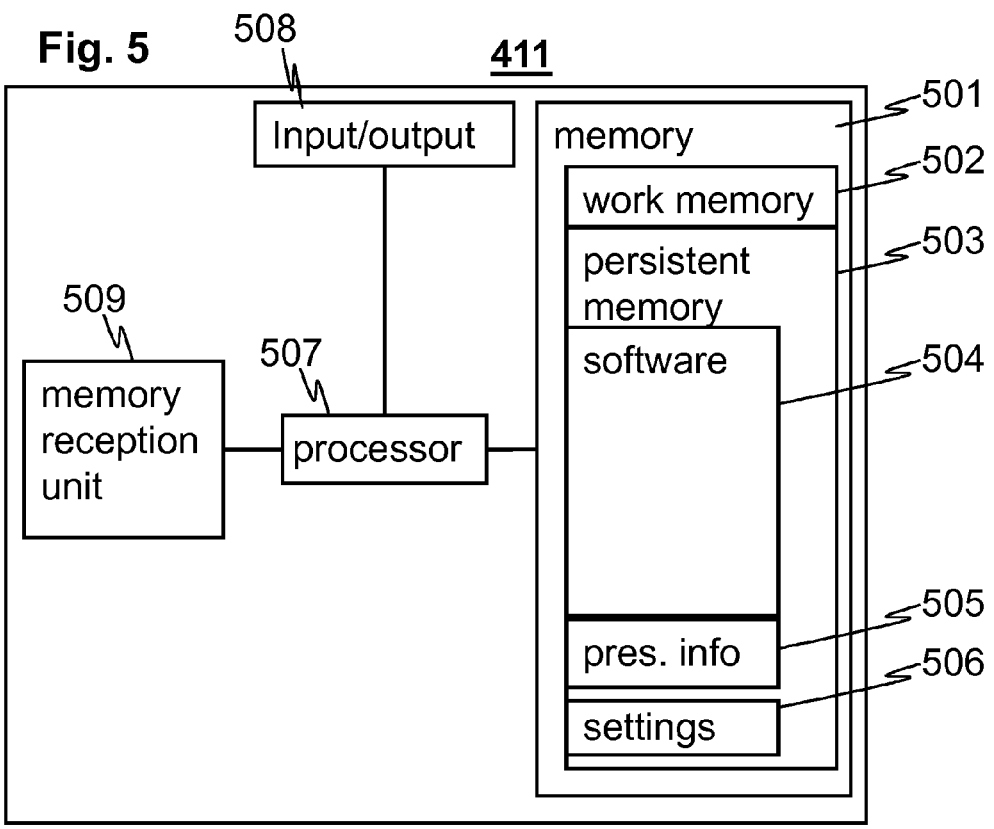
FIG. 5 shows a simplified block diagram of the structure of a control unit shown in FIG. 1 according to an embodiment of the invention.

FIG. 5 shows a simplified block diagram of the structure of the control unit 411. The control unit 411 may be based on, for example, a general purpose computer supplied with suitable software and/or on a particularly adapted computing device. While it is possible to implement the control unit 411 by purely hardware based a device, typically it is more economic and faster to produce by making use of software.

In FIG. 5, the control unit 411 is drawn to comprise a memory 501 that comprises a work memory 502, a non-volatile memory 503 that is configured to store software 504, presentation information 505 describing content to be presented by the system 400 and/or how pointing at different areas on the screen should be treated, and settings 506 needed e.g. for automatic calibration of the system 400. The software 504 may comprise any one or more of the following items: operating system, device drivers, display presentation application, hypertext markup language parser, image processing software, and drivers for different external equipment that may be connected to the system such as printers, further displays, further interactive systems 400, audio systems, and external IR illumination equipment (not shown).

The control unit 411 further comprises a processor 507 configured to control the operation of the control unit 411 according to the software 504 by executing computer executable program code contained by the software in the work memory 502. Alternatively, the control unit may be configured to execute the software in place in the non-volatile memory in which case the work memory may not be necessary. The control unit further comprises an input/output unit (I/O) 508 for exchanging signals with other elements of the system 400 and optionally also with external equipment. The I/O 508 may comprise e.g. any one or more of a universal serial bus port, a local area network port, an ISA bus, a PCI express bus, an IR port, a Bluetooth element, and a parallel port. Alternatively to being configured capable of communicating with external equipment, the system 400 may be provided with a transferable memory reception unit 509 such as a CD-ROM or DVD-ROM drive, memory card reader or memory stick reader which enables replacing part of the non-volatile memory e.g. for updating information to be displayed on the LCD screen 402.

In order to control the operation of various components of the system and to obtain the captured image, there are connections between the control unit or particularly its input/output unit 508 and other components of the system 400, while not shown in sake of clarity of the drawing. The control unit has generally the task of receiving a signal from the camera 407, detecting if and where the touching surface 401 is pointed at and typically also outputting the determination in a standard way e.g. emulating a computer drawing tablet, mouse or other known pointing device.

Generally, the control unit operation may comprise following acts:
  controlling the screen to show desired images to the user 413;
  controlling the IR lights 410 to produce IR light on demand for showing a pointing object 412 such as a user's 413 finger when brought close to the screen;
  obtaining signals corresponding to received IR light from the image capture unit 407;
  detecting from the received signals the pointing object at the touching surface 401;
  performing a predefined action based on the detected input, e.g. changing the image displayed on the screen 402 or following a hyperlink associated with the area at which the pointing object is detected; and/or
  detecting the amount of ambient IR light controlling the IR lights 410 accordingly.

It is appreciated that while the control unit may consist of one separate unit, the control unit 411 may alternatively be integrated with any other element. The control unit 411 may comprise two or more discrete elements each for one or more of the aforementioned acts.

Figures 6, 7:
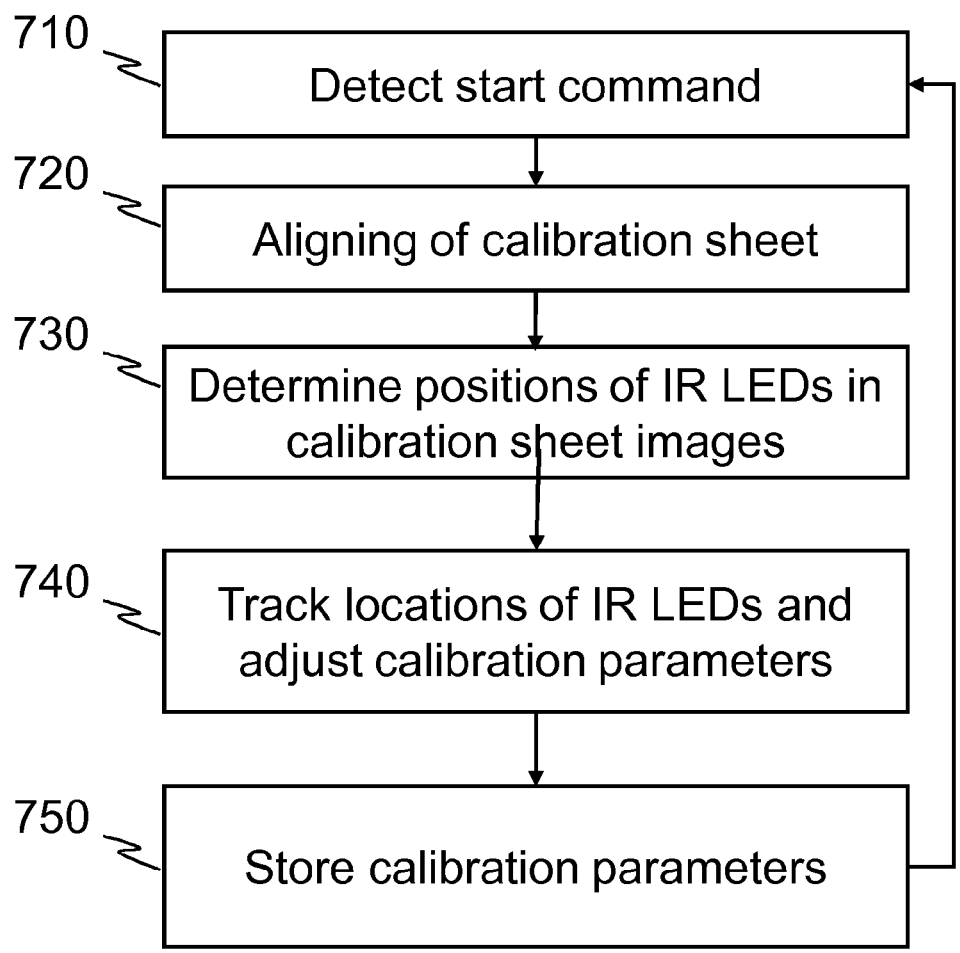
FIG. 6 shows an example of distribution of a touching surface into a plurality of sub-regions.
FIG. 7 shows a schematic flow chart according to an embodiment of the invention for illustrating a first phase in a process of determining a pointing object from an Infrared (IR) image captured by an IR image capture unit from behind of the pointing object under clear daylight or strong and relatively coherent ambient IR light.

FIG. 6 shows an example of distribution of a touching surface 401 into a plurality of sub-regions. The sub-regions are drawn to form an 8×4 matrix and denoted with reference signs 1-1 to 4-8.

FIG. 7 shows a schematic flow chart of a process according to an embodiment of the invention. First, a start command is detected 710. The start command 710 is issued e.g. using the touch screen or by use of other input device such as the button 409. As one alternative, the start command is detected by observing that the entire touch screen is covered by a calibration sheet. The calibration sheet comprises, for example, a sheet of plastic with IR LEDs to guide a parameter optimization procedure. The calibration sheet is aligned 720 to the touching surface 401. For this purpose, the calibration sheet may be manufacture to the exact size and shape of the touching surface so that when properly aligned, the calibration sheet edges conform to the edges of the touching surface 401 After detecting of the start command, the mutual positions of the IR LEDs are determined 730 and compared to those in pre-stored calibration information. As the LEDs are in given pre-determined arrangement or constellation, and as the LEDs produce clearly distinguishing marks on the images of the cameras, it is very simple to track 740 by the controller 411 the locations of the LEDs, and to adjust all parameters accordingly so that the images of the different cameras are correctly aligned. The adjusted calibration parameters are then stored 750 in the memory 501.

Figure 8:
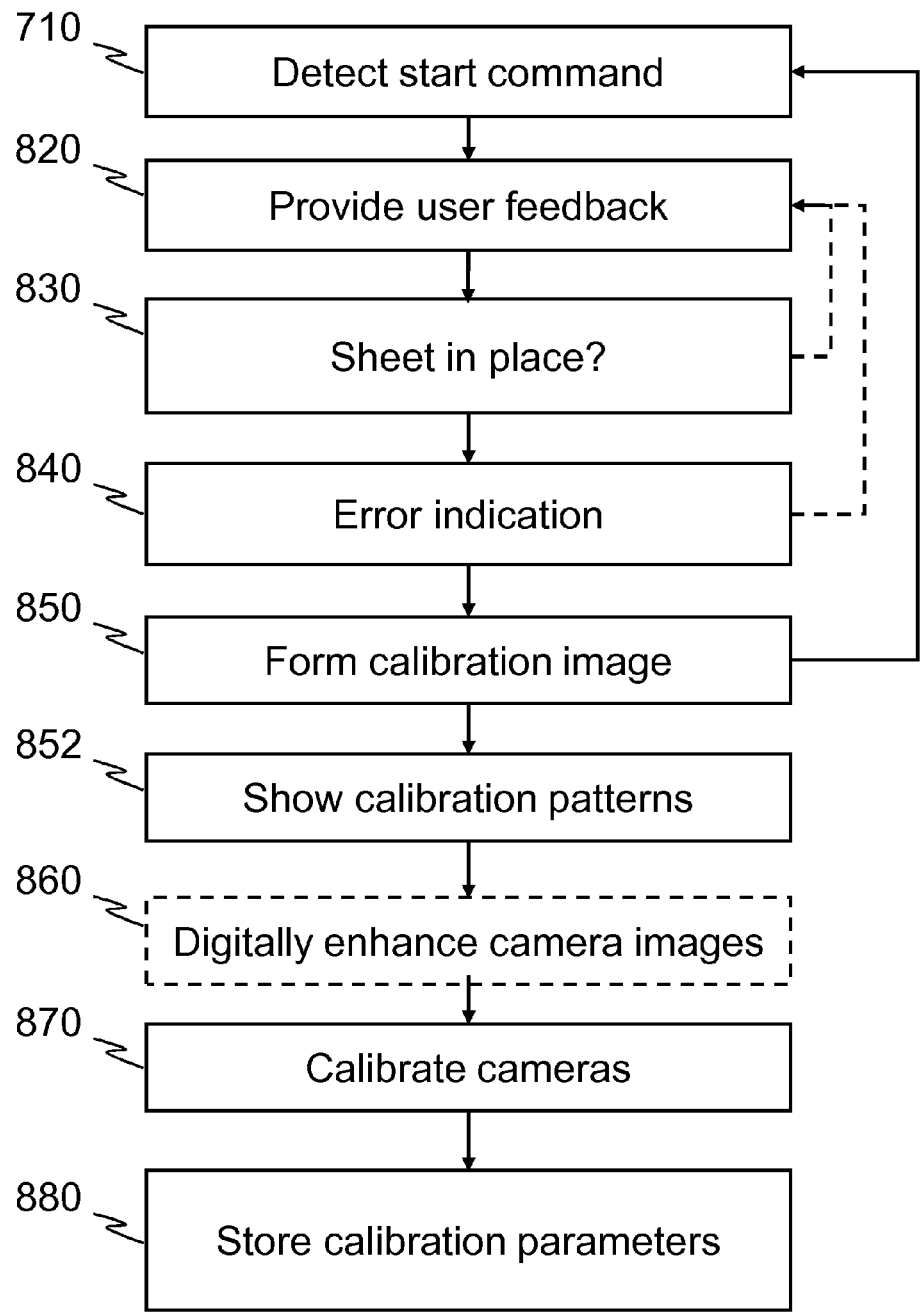
FIG. 8 shows a schematic flow chart of a process according to an embodiment of the invention.

FIG. 8 shows a schematic flow chart of a process according to an embodiment of the invention. As with FIG. 7, a start command is detected 710. Unlike with FIG. 7 embodiment, the process disclosed with reference to FIG. 8 requires no special piece of hardware. Moreover, the process of FIG. 8 may be easier and more accurate to implement because there is no need for any external hardware to be placed very accurately on the display. Further advantageously, instead of relying on special hardware, it is possible to use a simple sheet of white material or reflective, for example one or more sheets of ordinary copy paper, plastic, metal film (e.g. kitchen foil) or cardboard. Moreover, the sheet may be fluorescent so as to enhance the visibility of the appearance for infrared cameras. In response to detecting of the detecting 710 of the start command, the system 400 may provide 820 user feedback e.g. so that the display appears to count (down) numbers or show a progress bar, possibly with instructions for the coming calibration process. It may then be detected 830 whether a sheet extends over the display and if not, an error indication may be provided 840, and/or the system 400 may retry to detect a sheet on the touching surface or wait for a given period before finally the error indication is provided 840. When the touching surface is covered by a sheet, a calibration image is formed 850 for the cameras making use of the screen 402. Namely, ordinary LCD displays not only emit visible light, but some amount of IR light that is visible to the cameras. The forming of the calibration image involves showing 852 of various patterns on the screen 402. Some (typically very small) percentage of these patterns will be visible to the camera (in terms of camera capture dynamic range). The calibration of cameras is then performed 870 based on the patterns that are detected.

Unfortunately, the patterns produced by the screen 402 may be barely visible in the images captured by the cameras. However, the inventor has noticed that these barely visible images, that are not nearly good enough for normal calibration of cameras, can be digitally enhanced 860 before the calibration 870 to make the calibration images sufficiently visible. The digital enhancing 870 may involve for instance the following sub-steps:
1. Record n camera pictures, while the screen is completely black;
2. Record n camera pictures while the screen is completely white;
3. Record n camera pictures while a given calibration pattern is on the screen
4. Repeat step 3 for each calibration pattern.

n may be selected from a range 64 to 256. In alternative embodiments, n may be given lower or higher values based on an optimization wherein the calibration images become sufficiently clear while the time required for the calibration is not excessive. For instance, n may be empirically selected such that the calibration images are recognized in the images at least for 95, 99, or 99.5% of the systems 400. It is also appreciated that the calibration method may be performed differently in a manufacturing site and at customer premises.

Once we have this record of images we can easily create normalized versions of the patterns, assuming that,
PB is the average of all camera images captured with black display image
PW is the average of all camera images captured with white display image
PP is the average of all camera images captured with a given pattern
NP is the normalized image of a pattern To obtain normalized version of PP, we perform the following arithmetic operation on the images (per pixel) illustrated by equation (1):

$$NP=(PP-PB)/(PW-PB) \quad (1)$$

Figure 9:
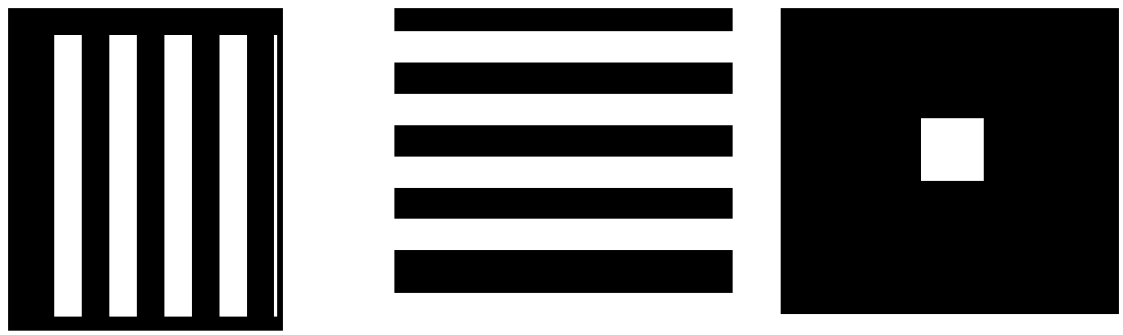
FIG. 9 shows different calibration images.

The resulting image may still be too noisy. Therefore, as phase 5, the noise can be reduced with well-known noise reduction algorithms, for example median filtering or low-pass filtering. After noise reduction, the images produced by the cameras may be enhanced that far that the calibration images shown in FIG. 9 can be identified from the images formed of the screen 402.

The process of FIG. 8 results in calibration parameters which are stored 880.

In one alternative embodiment, no calibration sheet is used at all. Instead of forming the calibration pattern by radiating or reflecting infrared light with the calibration sheet, the calibration pattern is formed by forming with the display and used to filter ambient light so that the calibration pattern is seen by the infrared cameras. For instance, LCD screens absorb infrared light selectively depending on each display pixel's current state and thus LCD screens can also produce the calibration pattern even without any sheet placed on the display. The formed calibration pattern may have less contrast than the calibration patterns that are produced using e.g. a reflective sheet on the display and internal infrared light sources that cast light through the LCD screen and also back (to the extent that the infrared light reflects from the reflective sheet). However, the disclosed methods for enhancing the detection of the calibration patterns are effective also in conjunction with this embodiment.

Figure 10A:
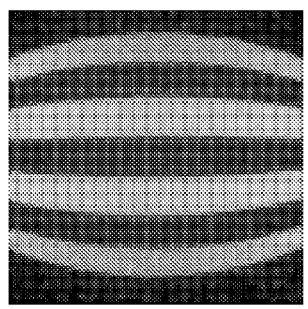
FIGS. 10a to 10d show captured and differently processed patterns.

Let us next consider various calibration processes that aid automatic calibration of the system 400, with reference to captured and differently processed patterns shown in FIGS. 10a to 10d. In these Figures, FIG. 10a shows a captured pattern (by one camera), after normalization and noise reduction, but with full geometry errors.

Figure 10B:
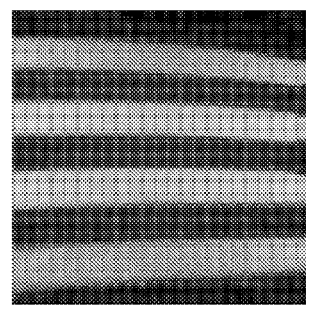

FIG. 10b shows a somewhat corrected camera image, based on source image (FIG. 10a). The correction is performed, for example, by re-sampling the image in FIG. 10a according to geometrical correction rules. The rules may be stored in a correction table where each matrix element stores a 2D vector indicating the source point from the uncorrected image. Alternatively, the rule maybe calculated in run-time for each image, so as to eliminate the need for the correction table. The re-sampling may be performed using various image filtering techniques, for example nearest-neighbor, bilinear filtering, spline interpolation, or other methods.

Figure 10C:
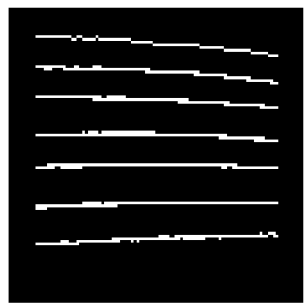

FIG. 10c shows a camera image with edge lines as detected with an edge-walk algorithm, based on the image of FIG. 10b.

Figure 10D:
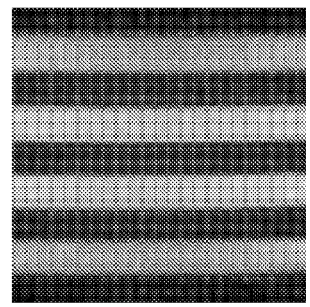

FIG. 10d shows a fully geometry corrected output, after the automatic calibration process.

The automatic calibration process involves creating error functions that represent different problems with the image. For example image 10b shows two kinds of error:
Lines that should be straight are curved
Parallel lines do not appear to be fully parallel.
In this case we can construct an error function by performing the following process:
1. Detect the edges of the stripes in FIG. 10b, and trace lines along the edges of the stripes, as in FIG. 10c.

2. Calculate the curvature of each line segment (there are 7 lines in this case rather than 8, as the lines too close to the edge of the image may be ignored, since they may disappear from the image area, or contain anomalies related to the edge of the image.
3. Calculate the average of the curvatures (AC)
4. Calculate the angles of the lines
5. Calculate the average angle of the lines
6. Calculate the average deviation from the average angle (AA)
7. For each line, calculate the deviation from the nearest multiple of 90 degree angle.
8. Calculate the average deviation from the nearest 90 degree angle (AD)

Before averaging the curvatures or angle differences the line segments may be remapped, to guide the optimization process. For example the error weight of a single line curvature may be calculated using a non-linear formula. By summing AC, AA, and AD we get an error function representing a combined effect of these three types of error. It is appreciated that additional error functions may be developed to counter specific types of error. We can then use any kind of numeric optimization method to minimize the error function. For instance, heuristics, simulated annealing, gradient descend, genetic algorithms etc. are methods suited for this purpose. We can further use a combination of different methods to improve the robustness and the speed of the optimization process. The optimization can be carried out in multiple passes, with each pass optimizing a subset of all parameters, with a different or similar algorithm, and different or similar error function.

Since the external device is a simple sheet of white material, the external device is very easy to produce, distribute and replace. Further, since the calibration patterns are directly on the screen, it is certain that the calibration pattern is exactly aligned with the screen and there is no offset due to misplacement of the calibration sheet.

Various technical effects of different embodiments of invention have been presented directly or implied by the preceding description. Some of these are summarized here:
  IR-camera can be used to detect visible-light images i.e. calibration reference images or patterns can be produced on a wavelength range that is mostly aside of the main wavelength range of the cameras being calibrated, but providing sufficient response on the IR camera, for the purposes of calibration;
  a simple sheet may be used in front of the screen to produce the reference patterns for calibration that are used to help in the detection of reference patterns or a dedicated calibration sheet may be used to accelerate the calibration;
  Parameter optimization can be performed using any generic numeric optimization of error functions; and
  Error functions measure different problems with the image, such as
    location of the camera region of interest (ROI), compared to desired ROI
    curvature of straight lines (distortion);
    orientation (rotation);
    size (scaling); and
    offset (2D translation).

The ROI of each camera may be optimized before proceeding with the calibration process disclosed with reference to FIG. 10b. The ROI optimization may involve the steps of:
1) Showing on the screen a pattern that has a small rectangle or circle at the center of the ROI;
2) Using a blob-detection algorithm, estimate the location of the blob in the uncorrected camera image;
3) Adjusting the active camera sensor capture area based on the difference of the blob location on the uncorrected image, compared to the ideal blob location on the uncorrected image; and
4) If the adjustment is small enough, then finish, otherwise return to step 1.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. In a camera-based touch display that has a touch screen covering at least a portion of the touch display, a method of calibrating the touch display to account for geometric distortions caused at least by tolerances in placement and properties of a plurality of infrared cameras used for identifying objects touching a touch screen of the touch display, the method comprising:
  presenting one or more calibration patterns on the touch display;
  with each of at least two of the plurality of the infrared cameras;
    capturing a plurality of images of the calibration patterns or of a portion of the touch screen when a sheet of white or reflective material is arbitrarily placed on the touch screen and combining the plurality of the captured images to obtain for each of the at least two cameras a combined single-camera image having increased signal to noise ratio;
  the method further comprising:
    forming a touch screen image from the combined single camera images, the touch screen image covering at least a portion of the touch screen;
    determining geometric distortions of the touch screen image with relation to the presented one or more calibration patterns;
    calculating calibration parameters from the determined geometric distortions, and
    storing the calibration parameters for subsequent compensation of images taken by the plurality of infrared cameras, of objects touching the touch display or proximate thereof.

2. The method of claim 1 further comprising detecting a start command from a user and responsively starting the calibration process.

3. The method of claim 1, comprising displaying information on the touch display using a wavelength range mostly aside of a main wavelength range of each of the at least two infrared cameras.

4. The method of any of claim 1, wherein the one or more calibrating patterns are presented in the visible light range and the method further comprises:
- forming a first image sequence PB by taking plural images while the visible image on the touch display is completely black;
- forming a second image sequence PW by taking plural images while the visible image on the touch display is completely white;
- forming a third image sequence PP by taking plural images while a given calibration pattern is produced by the touch display; and
- and wherein the step of processing comprises forming for each image sequence an enhanced collective image for the determining of geometric distortions of the images thereby producing respectively first, second and third enhanced image sequences PBe, PWe and PPe.

5. The method of claim 4, further comprising normalizing the images of the calibration pattern according to a formula NPe=(PPe−PBe)/(PWe−PBe), wherein NPe represents the normalized image pixel value.

6. The method of claim 4, further comprising reducing noise from the normalized images of the calibration pattern by noise reduction filtering.

7. The method of claim 1, wherein the calibration pattern comprises edges, and further comprising detecting edges of the calibration patterns.

8. An apparatus comprising:
- a touch display configured to display images, the touch display comprising a touch screen that covers at least a portion of the touch display;
- a plurality of infrared cameras configured to capture images of objects contacting a touch screen;
- the apparatus being configured to perform calibration of the touch display to account for geometric distortions caused at least by tolerances in placement and properties of the infrared cameras;
- the touch display being configured to form during the calibration at least one calibration pattern;
- a processor configured during the calibration to cause with each of at least two of the plurality of the infrared cameras;
  - capturing a plurality of images of the calibration patterns or of a portion of the touch screen when a sheet of white or reflective material is arbitrarily placed on the touch screen and combining the plurality of the captured images to obtain for each of the at least two cameras a combined single-camera image having increased signal to noise ratio;
- the processor being further configured to:
  - form a touch screen image from the combined single-camera images, the touch screen image covering at least a portion of the touch screen;
  - determine geometric distortions of the touch screen image with relation to the formed calibration pattern;
  - calculate calibration parameters from the determined geometric distortions; and
  - store the calibration parameters for subsequent compensation of images taken by the plurality of infrared cameras, of objects touching the touch display or proximate thereof.

9. The apparatus of claim 8, wherein the processor is further configured to detect a start command from a user and responsively start the producing of the image, the determining of the geometric distortions and the calculating of the calibration parameters.

10. The apparatus of claim 8, touch display has a wavelength range mostly aside of a main wavelength range of each of the group of infrared cameras.

11. The apparatus of claim 8, wherein the taking of the plural images involves displaying visible images on the touch display and the processor is further configured to:
- form a first image sequence PB by taking plural images while the visible image on the touch display is completely black;
- form a second image sequence PW by taking plural images while the visible image on the touch display is completely white;
- form a third image sequence PP by taking plural images while a given calibration pattern is produced by the touch display; and
- form for each image sequence an enhanced collective image for the determining of geometric distortions of the images thereby producing respectively first, second and third enhanced image sequences PBe, PWe and PPe.

12. The apparatus of claim 8, wherein the processor is further configured to normalize the images of the calibration pattern according to a formula $$NPe=(PPe-PBe)/(PWe-PBe),$$

wherein NPe represents the normalized image pixel value.

13. The apparatus of claim 12, wherein the processor is further configured to reduce noise from the normalized images of the calibration pattern by noise reduction filtering.

14. The apparatus of claim 8, wherein the processor is further configured to detect edges of the calibration patterns.

15. The apparatus of claim 14, wherein the processor is further configured to calculate curvature for the detected edges of the calibration patterns.

16. The apparatus of claim 15, wherein the processor is further configured to:
- individually calculate respective curvature of a plurality of line segments;
- calculate an average of the curvatures, AC;
- calculate mutual angles of the edges;
- calculate an average angle of the edges;
- calculate an average angle deviation AA from the calculated angles of the edges or from the average angle of the edges;
- calculate a combined error measure by summing the AC and AA;
- calculate average deviation AD from the nearest 90 degree angle; and
- calculate a combined error measure by summing the AC, AA and AD.

17. The apparatus of claim 8, wherein the processor is further configured to calculate error functions such that when the geometric errors in the image of the touch screen is compensated using the error functions, the combined error measure is smaller than with at least one other set of error functions.

18. The apparatus of claim 8, further comprising the sheet of white or reflective material.

19. The apparatus of claim 18, wherein the sheet of white or reflective material is copy paper, plastic, metal film or cardboard.

20. A non-transitory computer readable memory medium comprising computer executable program code which when executed by a processor causes an apparatus to perform, in a camera-based touch display that has a touch screen covering at least a portion of the touch display, calibrating the touch display to account for geometric distortions caused at least by tolerances in placement and properties of a plurality of infrared cameras used for identifying objects touching a touch screen of the touch display, by:

presenting one or more calibration patterns on the touch display;

with each of at least two of the plurality of the infrared cameras;

capturing a plurality of images of the calibration patterns or of a portion of the touch screen when a sheet of white or reflective material is arbitrarily placed on the touch screen and combining the plurality of the captured images to obtain for each of the at least two cameras a combined single-camera image having increased signal to noise ratio;

and to further perform the calibrating by;

forming a touch screen image from the combined single camera images, the touch screen image covering at least a portion of the touch screen;

determining geometric distortions of the touch screen image with relation to the presented one or more calibration patterns; and calculating calibration parameters from the determined geometric distortions, and storing the calibration parameters for subsequent compensation of images taken by the plurality of infrared cameras, of objects touching the touch display or proximate thereof.

\* \* \* \* \*